A. SCHAFFER.
MILK BOTTLE SAFETY RECEPTACLE.
APPLICATION FILED MAY 27, 1916.
1,228,057.
Patented May 29, 1917.
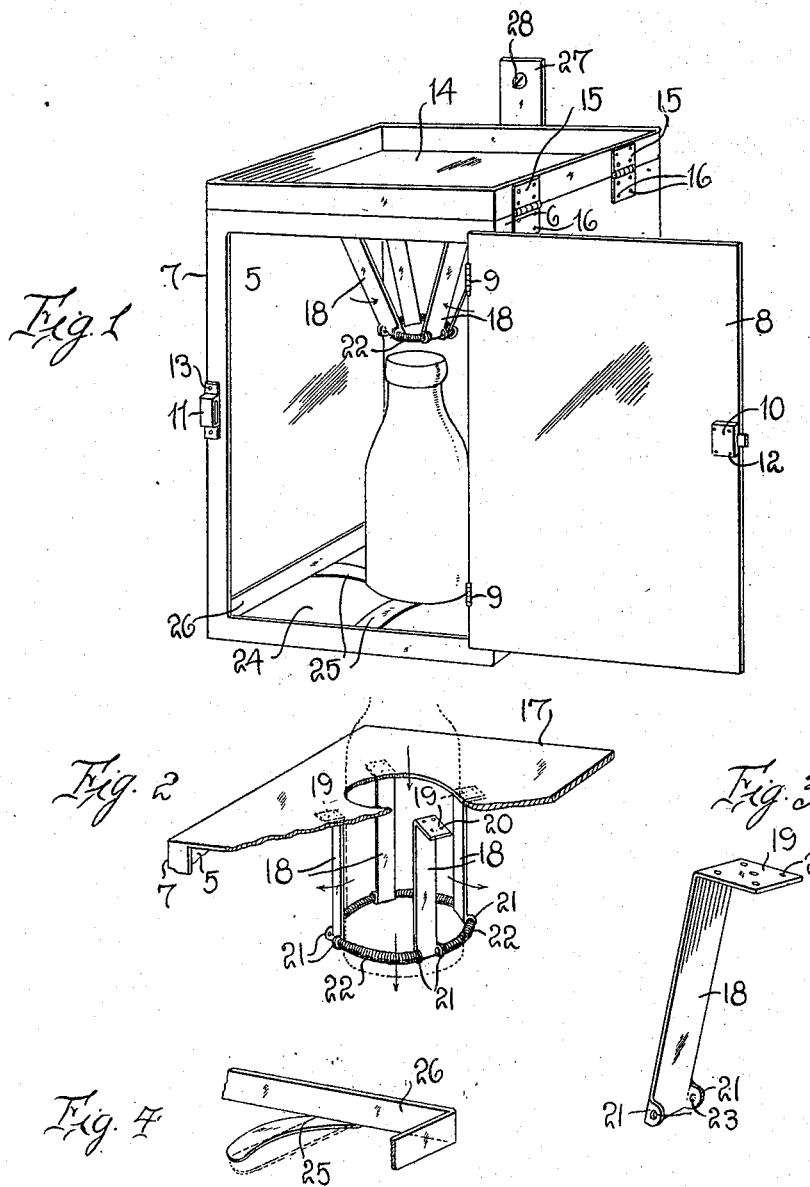

UNITED STATES PATENT OFFICE.

ARTHUR SCHAFFER, OF RIVERSIDE, NEW JERSEY.

MILK-BOTTLE SAFETY-RECEPTACLE.

1,228,057. Specification of Letters Patent. Patented May 29, 1917.

Application filed May 27, 1916. Serial No. 100,351.

*To all whom it may concern:*

Be it known that I, ARTHUR SCHAFFER, a citizen of the United States, residing at Riverside, in the county of Burlington and State of New Jersey, have invented certain new and useful Improvements in Milk-Bottle Safety-Receptacles, of which the following is a specification, reference being had to the accompanying drawings.

This invention is a milk bottle safety receptacle.

One object of this invention is to provide a receptacle into which the milk distributer may place a full milk bottle and from the top take away an empty bottle.

Another object is to provide a receptacle that may be readily opened by an authorized person and thus prevent the abstraction of a filled milk bottle by an unauthorized person.

A further object is to provide a receptacle that will be easy and cheap to manufacture, not liable to get out of order and, therefore, lasting in service and one that may be readily installed.

One practical form of construction of the invention will be described and illustrated in the accompanying drawings, in which—

Figure 1 is a perspective view of the receptacle open;

Fig. 2 is a broken section perspective view of the depending members showing a bottle passing downward;

Fig. 3 is an enlarged perspective view of one of the depending resilient members;

Fig. 4 is a perspective view of one of the resilient fingers secured to the bottom of the receptacle.

The receptacle or safe may be formed of any suitable shape and material and is shown in Fig. 1 as being substantially rectangular in form and composed of some material such as galvanized iron. This receptacle comprises side walls 5 and 6. The front wall 7 is made preferably as a frame, as shown in Fig. 1. A door 8 may be secured to the frame or front 7 in any suitable manner. One means of mounting for hinged movement is by the common or ordinary form of hinges 9.

The door 8 may be provided with a lock 10 and to coöperate with this lock a keeper 11 is provided mounted upon the frame 7. The lock may be secured to the door in any convenient way, one means being shown by the rivets 12 and the keeper 11 may be secured to the frame 7 by means of the rivets 13, as shown.

In Fig. 1 there is shown a top 14 which is preferably formed as a tray and this is provided with upstanding walls around its outer edges. This top 14 may be hingedly connected to the sides 6 in any convenient manner, one means of connecting being shown by the hinges 15 and these hinges may be secured both to the top and to the side wall by means of the rivets 16, as shown. This top 14 being formed as a tray provides a convenient place on which may be positioned an empty milk bottle or message for the milk distributer. This top 14 also is so formed that it fits in close abutting engagement with the sides, front and back walls of the receptacle. The hinges 15 permit the top to be raised so that access may be had to the stationary top positioned just below it.

The stationary top 17 is preferably provided centrally with a suitable aperture which is of sufficient size to accommodate the ordinary or common form of milk bottle such as the milk distributer would leave at a house. Around this aperture there are secured a plurality of depending resilient members 18, one of which is shown more clearly in Fig. 3. These depending members 18 may be secured by riveting or in any other convenient manner so that their top ends will be held securely to the stationary top 17. These resilient members 18 are preferably provided at the top with an angular projecting portion 19 which is provided with suitable apertures 20. The depending portion is preferably straight and adjacent the lower end there are formed two eyelets or ears 21 provided with suitable apertures 23 which are angularly disposed with reference to the straight depending portion.

To more effectually maintain the depending members 18 in a convergent relation, coil springs 22 are connected to the several ears 21 formed on the depending members 18 and disposed between adjacent members, these coil springs being approximately arcuate in form so as to snugly embrace the body of the milk bottle when it is inserted. These depending members and the ears 21 which are provided with the apertures 23 are adapted to engage with these springs 22 in such a manner that a milk bottle passing downward in the position shown in Fig. 2 may be deposited in the receptacle with little trouble. Inasmuch as the lower ends of the resilient members are drawn into convergent relation to define a circle smaller than the cross section of the area of the milk bottle, it will be obvious that it will be impossible to withdraw the bottle through the aperture in the top.

The bottom or tray part 24 which is secured to the walls of the receptacle may be provided with the resilient fingers 25. These resilient fingers 25 are preferably secured at one end near the walls of the receptacle so that their free ends extend upwardly and away from the plane of the bottom 24. Thus when the milk bottle is passed downwardly, in the direction shown in Fig. 2, the bottle will land or contact with the several fingers and the downward force and shock very much reduced. These resilient fingers 25 being formed preferably of some material such as steel or spring brass, will prevent the bottle from contacting too quickly with the bottom 24 of the receptacle. Any number of these fingers 25 may be provided, although in the perspective view in Fig. 1, only two are shown, indicating that four of these springs are employed in the embodiment shown. To more effectually strengthen the lower portion of the receptacle, the frame 26 is positioned adjacent the several walls and the bottom to which it may be secured in any convenient manner. A portion of this frame is shown in Fig. 4 to which is connected one end of the resilient finger 25.

In order to position this receptacle at some convenient point, the hanger 27 is shown which may be of any suitable shape. This hanger is provided with suitable apertures through which may be passed screws, one screw 28 being illustrated in Fig. 1.

Minor changes in the form and details of construction may be resorted to without departing from the spirit of my invention or the scope of the appended claim.

Having thus described this invention, what is claimed is:—

A receptacle of the character described having a top formed with an opening for the insertion of a bottle, a plurality of strips of resilient material each having an angularly bent upper end attached to the top and disposed at uniform distance around the opening, the free lower ends of the strips being urged toward each other by the resilience of the strips, the lower ends of the strips being formed with upwardly projecting ears, and coiled springs disposed between the lower ends of the strips and operatively connected to said ears, said springs yieldingly resisting outward movement of the lower ends of the strips and yieldingly holding the strips in spaced relation.

In testimony whereof I hereunto affix my signature in the presence of two witnesses.

ARTHUR SCHAFFER.

Witnesses:
  EMMA C. ZIEGLER,
  CHAS. H. ZIEGLER.

Copies of this patent may be obtained for five cents each, by addressing the "Commissioner of Patents, Washington, D. C."